United States Patent [19]

Jones et al.

[11] Patent Number: 4,990,186

[45] Date of Patent: Feb. 5, 1991

[54] INK COMPOSITION FOR INK JET PRINTING

[75] Inventors: Raymond T. Jones, Webster; Thomas J. Clifford, Jr., Rochester, both of N.Y.

[73] Assignee: Eastman Kodak Company, Rochester, N.Y.

[21] Appl. No.: 415,459

[22] Filed: Oct. 2, 1989

Related U.S. Application Data

[63] Continuation of Ser. No. 204,828, Jun. 10, 1988, abandoned.

[51] Int. Cl.$^5$ ............................................... C09D 11/02
[52] U.S. Cl. ........................................ 106/22; 106/20; 106/26
[58] Field of Search ............................... 106/20, 22, 26

[56] References Cited

U.S. PATENT DOCUMENTS

| | | | |
|---|---|---|---|
| 3,705,043 | 12/1972 | Zabiak | 106/20 |
| 4,024,096 | 5/1977 | Wachtel | 106/22 |
| 4,070,322 | 1/1978 | Hwang et al. | 260/29.6 |
| 4,176,361 | 11/1979 | Kawada et al. | 346/1.1 |
| 4,256,492 | 3/1981 | Matsumoto et al. | 106/26 |
| 4,290,072 | 9/1981 | Mansukhani | 106/20 |
| 4,409,039 | 10/1983 | Lepesant et al. | 106/22 |

FOREIGN PATENT DOCUMENTS

0147257  3/1987  European Pat. Off. .

OTHER PUBLICATIONS

Defensive Publication T903,023 Clarence Hunter, 10/72 "Reproductive Toxicity of Glycol Ethers", Reproductive Toxicology, vol. 4, No. 4, pp. 15–18, 7–85.

*Primary Examiner*—Mark L. Bell
*Assistant Examiner*—Helene Klemanski
*Attorney, Agent, or Firm*—Robert A. Linn

[57] ABSTRACT

An ink composition that is useful in ink jet printing contains a polymeric binder and a dye dissolved in a liquid medium containing water, certain organic liquids which function as a solvent for the binder and the dye, and certain other organic liquids which function as evaporation retardants. The ink composition is environmentally safe, has excellent shelf life, and exhibits excellent physical and chemical properties for use in ink jet printers.

3 Claims, No Drawings

INK COMPOSITION FOR INK JET PRINTING

This is a continuation of application Ser. No. 204,828 filed June 10, 1988, now abandoned.

FIELD OF THE INVENTION

This invention relates in general to ink compositions and in particular to ink compositions that are useful in ink jet printing processes. More specifically, this invention relates to a novel ink composition useful in ink jet printing which is free from environmentally objectionable solvents.

BACKGROUND OF THE INVENTION

Ink jet printers are well known. In general, they comprise ink jet orifices, means for delivering an ink composition to the orifices, and means for causing the ink composition to emerge from the orifices in an imagewise pattern. To be useful in ink jet printing, an ink composition must be capable of meeting an extensive list of rather stringent criteria. Among the numerous factors which are of concern are such properties of the ink composition as viscosity, surface tension, pH, density, conductivity, adhesive characteristics, wetting characteristics, drying rate and shelf life.

A wide variety of different ink formulations have been proposed heretofore for use in ink jet printing. Among the numerous ink compositions of this type are those disclosed in U.S. Pat. Nos. 3,705,043, 4,024,096, 4,070,322, 4,153,467, 4,155,768, 4,176,361, 4,197,135, 4,396,429 and 4,409,039.

It is known to employ inks in ink jet printing in which a polymeric binder and a dye are dissolved in a solvent medium containing both water and an organic solvent. (See, for example, European Patent Specification No. 0 147 257, published July 8, 1987). Inks of this type, which exhibit very good characteristics in ink jet printing, can be formulated with the use of 2-methoxyethanol or methylene chloride as solvents. However, such solvents present significant health and environmental hazards, which render their use in ink compositions undesirable in many situations.

It is toward the objective of providing a novel ink composition that meets the stringent criteria required for use in ink jet printing, but is environmentally safe, that the present invention is directed.

SUMMARY OF THE INVENTION

In accordance with this invention, an ink composition that is useful in ink jet printing, contains a polymeric binder and a dye dissolved in a liquid medium containing water, at least one organic liquid which functions as a solvent for the binder and the dye, and at least one organic liquid which functions as an evaporation retardant. The ink composition is environmentally safe, has excellent shelf life, and exhibits excellent physical and chemical properties for use in ink jet printers.

Specifically, the novel ink composition of this invention consists essentially of:

(1) from 60 to 90 percent by weight of a solvent consisting of at least one member selected from the group consisting of methyl ethyl ketone, acetone, ethyl alcohol, ethyl acetate, cyclohexanone and diacetone alcohol;

(2) from 2 to 7 percent by weight of a polymeric binder that is soluble in the solvent;

(3) from 3 to 8 percent by weight of a dye that is soluble in the solvent;

(4) from 2 to 11 percent by weight of an evaporation retardant consisting of at least one member selected from the group consisting of 4-butyrolactone and butyl alcohol; and (5) from 3 to 14 percent by weight of water.

Such composition satisfies all of the criteria for a useful ink for ink jet printing—including requirements relating to viscosity, surface tension, pH, density, conductivity, adhesive characteristics, wetting characteristics, drying rate and shelf life—and does not employ ingredients which pose significant health or environmental hazards.

DESCRIPTION OF THE PREFERRED EMBODIMENTS

As indicated above, the ink composition of this invention contains five essential ingredients. The first is a solvent which functions to dissolve both the dye and the polymeric binder. The useful solvents are selected from the group consisting of methyl ethyl ketone, acetone, ethyl alcohol, ethyl acetate, cyclohexanone, diacetone alcohol, and mixtures thereof. The solvent, whether a single liquid or mixture of liquids, is included in the ink composition in an amount of from 60 to 90 percent by weight. It is particularly preferred to use methyl ethyl ketone as the solvent.

The second essential ingredient is a polymeric binder which is employed in an amount of 2 to 7 percent by weight. The key functions of the polymeric binder are to provide adequate adhesion to the surface being printed and to aid in forming durable and smudge resistant print. Preferred polymeric binders in the ink compositions of this invention are cellulose esters including lower acid esters of cellulose such as cellulose acetate, cellulose propionate and cellulose butyrate and mixed lower acid esters of cellulose such as cellulose acetate propionate, cellulose acetate butyrate and cellulose propionate butyrate. It is particularly preferred to use cellulose acetate propionate as the polymeric binder. Other useful polymeric binders include homopolymers of methyl methacrylate, ethyl methacrylate and n-butyl methacrylate and methyl methacrylate/n-butyl methacrylate copolymers.

The third essential ingredient is a dye that is employed in an amount of 3 to 8 percent by weight to provide the desired color to the ink. Any of numerous dyes that are commercially available can be used to formulate the ink. Useful dyes include those of the azo, anthraquinone, methine and disazo classes. A particularly preferred dye is Orasol black dye, which is commercially available from CIBA-GEIGY CORPORATION and is identified in the Color Index as CI Solvent Black 29.

The fourth essential ingredient of the ink composition of this invention is 4-butyrolactone, butyl alcohol or mixtures thereof. This ingredient functions as an evaporation retardant and its main purpose is to control drying time. Thus, the ink must dry rapidly enough to avoid offsetting or smearing but not so rapidly as to cause plugging of the orifices in the ink jet printer. Good results are obtained with the use of 4-butyrolactone, or butyl alcohol or mixtures thereof in an amount of 2 to 11 percent by weight.

The fifth essential ingredient is water, and its primary function is to control the electrical resistivity of the ink composition so that charging and deflection of the ink droplets occurs in a satisfactory manner. It also functions to some extent to control the drying time. Water is usefully employed in the ink compositions of this invention in an amount of 3 to 14 percent by weight.

The invention is further illustrated by the following examples of its practice.

Ink compositions within the scope of this invention were formulated from methyl ethyl ketone, cellulose acetate propionate, Orasol black dye, water and 4-butyrolactone, as indicated in Table 1 below. In the table, drying times are reported for ink jet printing on a polyethylene terephthalate support of both alpha numerics and bar code using a VIDEOJET II ink jet printer.

TABLE 1

| Test No. | % Methyl Ethyl Ketone | % 4-Butyro-lactone | % Water | % Cellulose Acetate Propionate | % Orasol Black | Viscosity (CPS) | Electrical Resistance (ohms) | Drying Time (seconds) | |
|---|---|---|---|---|---|---|---|---|---|
| | | | | | | | | Alpha Numerics | Bar Code |
| 1 | 81.0 | 4.7 | 6.5 | 3.1 | 4.7 | 1.9 | 641 | 1 | 5 |
| 2 | 74.5 | 4.7 | 13.0 | 3.1 | 4.7 | 2.5 | 678 | 1 | 5 |
| 3 | 75.7 | 10.0 | 6.5 | 3.1 | 4.7 | 2.2 | 628 | 1 | 6 |
| 4 | 76.5 | 7.5 | 8.2 | 3.1 | 4.7 | 2.2 | 630 | 1 | 10 |

The formulations described in Table 1 meet all of the requirements necessary for successful use in an ink jet printing process and are fully acceptable from an environmental and health standpoint.

Results obtained with ink formulations outside the scope of this invention were as follows:

| Comparative Test No. 1 | |
|---|---|
| Ingredient | Weight % |
| Methyl ethyl ketone | 57.6 |
| 2-Methoxyethanol | 23.4 |
| 4-Butyrolactone | 4.7 |
| Water | 6.5 |
| Cellulose acetate propionate | 3.1 |
| Orasol Black Dye | 4.7 |
| | 100.0 |

This formulation provides excellent results in an ink jet printer but is unsatisfactory because of the health hazards of 2-methoxyethanol.

| Comparative Test No. 2 | |
|---|---|
| Ingredient | Weight % |
| Butyl alcohol | 48.6 |
| Chlorobenzene | 32.4 |
| 4-Butyrolactone | 4.7 |
| Water | 6.5 |
| Cellulose acetate propionate | 3.1 |
| Orasol Black Dye | 4.7 |
| | 100.0 |

This formulation is environmentally acceptable but unsatisfactory for use in ink jet printers because of its unsatisfactory shelf life of less than one week.

| Comparative Test No. 3 | |
|---|---|
| Ingredient | Weight % |
| Butyl alcohol | 46.2 |
| Diethyl carbonate | 34.8 |
| 4-Butyrolactone | 4.7 |
| Water | 6.5 |
| Cellulose acetate propionate | 3.1 |
| Orasol Black Dye | 4.7 |

| -continued | |
|---|---|
| Comparative Test No. 3 | |
| Ingredient | Weight % |
| | 100.0 |

This formulation is environmentally acceptable but unsatisfactory for use in ink jet printers because of its unsatisfactory shelf life of less than one week.

Comparative Test No. 4

Ink compositions were formulated from methyl ethyl ketone, methylene chloride, 4-butyrolactone, water, cellulose acetate propionate and Orasol black dye as follows:

| Test No. | % Methyl Ethyl Ketone | % Methylene Chloride | % 4-Butyro-lactone | % Water | % Cellulose Acetate Propionate | % Orasol Black |
|---|---|---|---|---|---|---|
| 1 | 72.9 | 8.1 | 4.7 | 6.5 | 3.1 | 4.7 |
| 2 | 64.8 | 16.2 | 4.7 | 6.5 | 3.1 | 4.7 |
| 3 | 71.4 | 7.9 | 4.7 | 8.2 | 3.1 | 4.7 |
| 4 | 63.4 | 15.8 | 4.7 | 8.2 | 3.1 | 4.7 |

These formulations provide satisfactory results in ink jet printers but are unsatisfactory because of the health hazards of methylene chloride.

Comparative Test No. 5

Ink compositions were formulated from methyl ethyl ketone, methylene chloride, cyclohexanone, cellulose acetate propionate and Orasol Black dye as follows:

| Test No. | % Methyl Ethyl Ketone | % Methylene Chloride | % Cyclohexanone | % Cellulose Acetate Propionate | % Orasol Black |
|---|---|---|---|---|---|
| 1 | 6.5 | 42.9 | 42.8 | 3.1 | 4.7 |
| 2 | 8.0 | 42.9 | 41.8 | 3.1 | 4.7 |
| 3 | 6.5 | 43.7 | 43.7 | 3.1 | 3.0 |

These formulations did not provide satisfactory drop formation in an ink jet printer. They are also unsatisfactory because of the health hazards of methylene chloride.

Considering all of the above data, it is apparent that common organic solvents such as 2-methoxyethanol, methylene chloride, chlorobenzene and diethyl carbonate fail to meet the requirements of the ink jet printing industry because of performance deficiencies or health and environmental concerns or both. In marked contrast, the novel ink compositions disclosed herein are acceptable from a health and safety standard and effective in meeting the stringent criteria of the ink jet printing industry.

The invention has been described in detail with particular reference to a preferred embodiment thereof, but it will be understood that variations and modifications can be effected within the spirit and scope of the invention.

What is claimed is:

1. An ink composition useful in an ink jet printing process, said ink composition consisting essentially of:
   (1) from 60 to 90 percent by weight of a solvent consisting of at least one member selected from the group consisting of methyl ethyl ketone, acetone, ethyl alcohol, ethyl acetate, cyclohexanone and diacetone alcohol;
   (2) from 2 to 7 percent by weight of a polymeric binder that is soluble in said solvent;
   (3) from 3 to 8 percent by weight of a dye that is soluble in said solvent;
   (4) from 2 to 11 percent by weight of an evaporation retardant consisting of at least one member selected from the group consisting of 4-butyrolactone and butyl alcohol; and (5) from 3 to 14 percent by weight of water.

2. An ink composition useful in an ink jet printing process, said ink composition consisting essentially of:
   (1) from 60 to 90 percent by weight of methyl ethyl ketone,
   (2) from 2 to 7 percent by weight of cellulose acetate propionate;
   (3) from 3 to 8 percent by weight of a dye that is soluble in methyl ethyl ketone;
   (4) from 2 to 11 percent by weight of 4-butyrolactone; and (5) from 3 to 14 percent by weight of water.

3. An ink composition useful in an ink jet printing process, said ink composition consisting essentially of:
   (1) about 76 percent by weight of methyl ethyl ketone;
   (2) about 3 percent by weight of cellulose acetate propionate;
   (3) about 5 percent by weight of Orasol black dye;
   (4) about 8 percent by weight of 4-butyrolactone; and
   (5) about 8 percent by weight of water.

* * * * *